Figure 1:
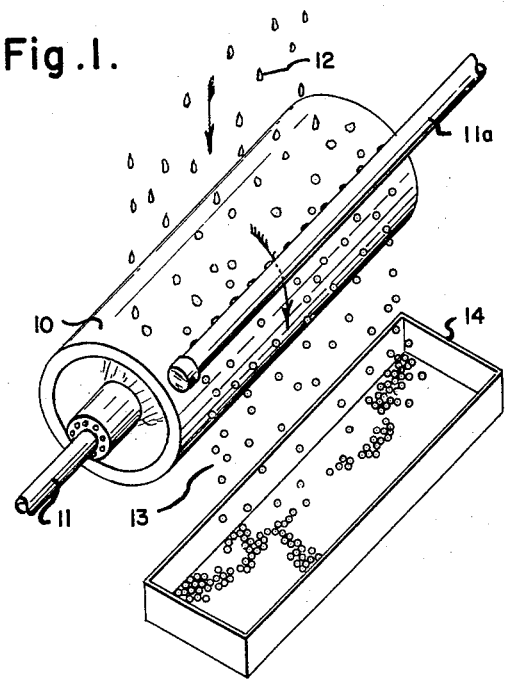

Sept. 8, 1964  C. W. SCHOTT  3,148,045
METHODS AND APPARATUS FOR PRODUCING SIZED SPHERICAL PARTICLES
Filed Nov. 21, 1958  2 Sheets-Sheet 1

INVENTOR
Charles W. Schott

Sept. 8, 1964 C. W. SCHOTT 3,148,045
METHODS AND APPARATUS FOR PRODUCING SIZED SPHERICAL PARTICLES
Filed Nov. 21, 1958 2 Sheets-Sheet 2

INVENTOR
Charles W. Schott

United States Patent Office 3,148,045
Patented Sept. 8, 1964

3,148,045
METHODS AND APPARATUS FOR PRODUCING SIZED SPHERICAL PARTICLES
Charles W. Schott, Pittsburgh, Pa., assignor to Union Carbide Corporation, New York, N.Y., a corporation of New York
Filed Nov. 21, 1958, Ser. No. 775,547
7 Claims. (Cl. 65—21)

This invention relates to methods and apparatus for producing sized particles and, particularly, to methods and apparatus for producing sized spherical particles of refractory and like materials, such as metals.

There has long been a need for an apparatus and method capable of producing sized spherical particles of refractory materials such as, for example, glass, slag, ores and various metallic and non-metallic compositions of relatively high viscosity. This invention will be specifically described with reference to a method and apparatus for making glass spheres but the method and apparatus may be similarly used to produce spheres of other like materials.

Glass spheres as well as spheres of other like material have been heretofore produced by rolling semi-plastic heated glass between plates until a desired spherical shape has been obtained. This is a slow and expensive practice and as a result the cost of glass spheres has been exorbitantly high as compared with most other glass products.

I have invented an apparatus and a method which is capable of making pellets of glass, slags, ores and like materials which method and apparatus imparts a relatively low terminal shock on the formed pellets and is capable of producing pellets of selectively controlled size characteristics.

I provide a source of material to be formed, heat transfer means which is not wetted by said material at the temperature of contact, said heat transfer means being adapted to receive the material to be formed and to deliver said material from a source of high temperature which is the highest temperature in the system to a source of lower temperature and collecting means receiving the formed particles. Preferably, I introduce measured quantities of the material to be formed, either liquid or solid, on to surface sloping away from the area of first contact. Preferably, this surface is graphite or carbon. I provide heating means adjacent to the surface or surfaces transferring heat to the material to hold it at the fusion point until spheres are formed. Preferably, I maintain the particles in contact with the surface or surfaces in the presence of heat until the spheres are formed and thereafter permit them to roll from the surface or surfaces through a cooling zone to a collecting bin. Preferably, the surface or surfaces are provided with a hot forming zone and an adjacent cooling zone.

Figure 2:
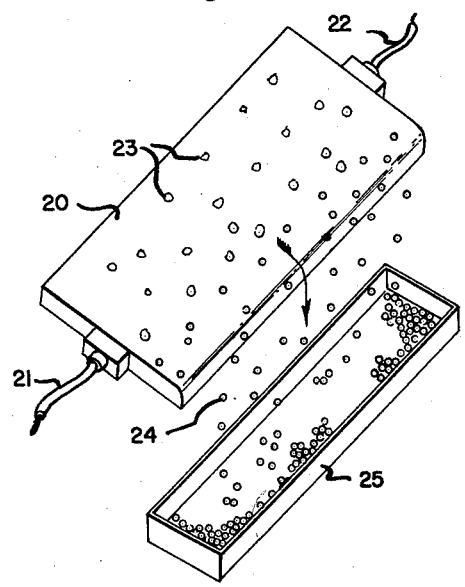
Figure 3:
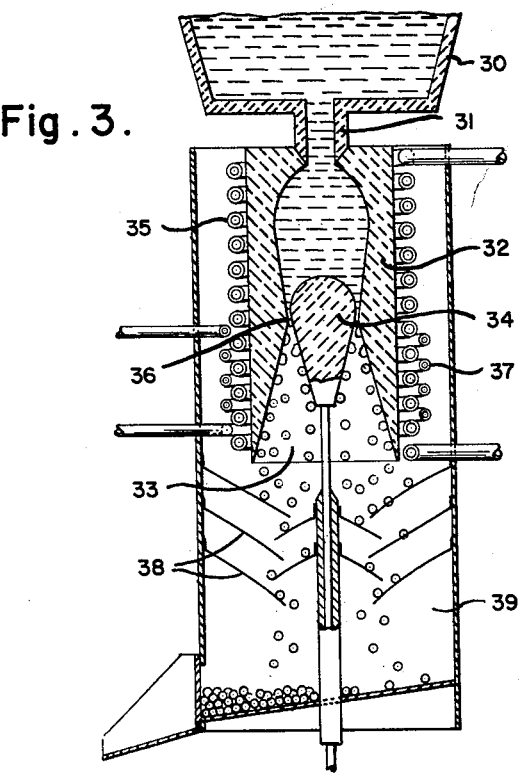
Figure 4:
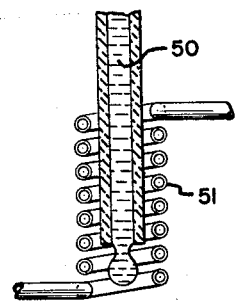
Figure 5:
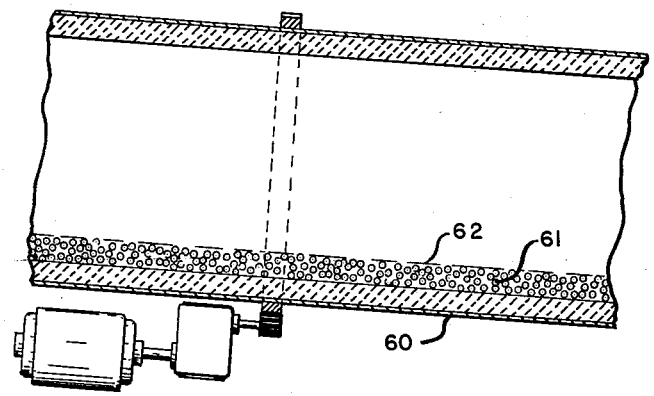

In the foregoing general statement, I have set out certain purposes, objects and advantages of my invention. Other purposes, objects and advantages will be evident from the following description of the accompanying drawings in which, FIGURE 1 is a preferred embodiment of my invention;
FIGURE 2 is a second embodiment of the invention;
FIGURE 3 is a vertical section through a third embodiment of my invention;
FIGURE 4 is a vertical section through a fourth embodiment of my invention; and
FIGURE 5 is a section through a rotary barrel furnace as may be used according to this invention.

Referring to the drawings, I have illustrated a graphite cylinder 10 capable of being rotated about its axis in the clockwise direction. A burner 11 is provided to introduce heat into the interior of the graphite cylinder to raise the cylinder to a temperature above that at which the material to be pelletized will fuse. A second burner 11a is provided to direct heat onto the outer periphery of the cylinder whereby to permit the maximum effectiveness of surface tension of the material. Globs or granules of material to be pelletized 12 are dropped onto the slowly rotating drum. The invention will be described hereinafter with particular reference to the pelletizing of glass, and we will assume that the globs or granules 12 are of glass. These globs or granules may be partly fused; they may be globs or granules of crushed glass; they may be threads of glass or any other convenient or desired form. Preferably, the globs or granules are fed to the cylinder 10 in regulated quantities so as to produce uniform spherical pellets. The globs or granules of glass 12 strike the surface of the drum 10. The heat from the burner 11 is transferred through the drum 10 to act on the globs of material as is the heat from the burner 11a. These globs of material are heated to complete fusion whereupon their surface tension immediately draws them into a sphere which rolls along the surface of the rotating cylinder maintaining the spherical shape and finally dropping from the cylinder through a relatively short cooling area 13 into a receiving hopper 14 from which they are periodically removed.

In the embodiment illustrated in FIGURE 2, I have shown a graphite plate 20 heated by passing electricity through wires 21–22 through the plate from a source of electrical energy not shown. Heat may alternatively be imposed from a burner directed onto the carbon surface or by a surrounding heating chamber or any similar means. Small globules of material either in the form of molten glass, broken glass or semi-fused glass are dropped onto the plate. The heated plate immediately acts on the glass globules 23 to raise them to their fusion point whereupon surface tension causes them to form into spheres. The plate 20 is arranged at a sufficient slope so that when the particles form into spheres they begin to roll down the surface of the plate maintaining their spheroidization. Alternatively, the spheres may be moved across the plate by rotating or vibrating the plate. The spheres 24 drop from the edge of the plate into a hopper 25 from which they are periodically removed.

In FIGURE 3, I have illustrated a third embodiment. In this embodiment, I provide a tank 30 of molten glass; a feeder tube 31 delivers molten glass into a formed graphite crucible 32. The crucible 32 is provided with an outlet in the form of a frusto-conical opening 33 having its large end remote from the interior of the crucible 32. The small end of the conical discharge opening 33 is stoppered with a conical plug 34 whose small end is remote from the small end of the opening 33. An induction heating coil 35 is provided about the graphite crucible 32. Glass is fed from the tank 30 through the feeder tube 31 into the interior of a crucible 32. In the crucible 32 the glass is raised to just under the desired forming temperature by heating provided through induction coil 35. The graphite plug 34 is raised into the interior of the crucible 32 to form an annular opening 36 between the small end of the discharge opening 33 and the plug 34. Glass in the interior of the crucible 32 will flow through this opening into the conical area of the discharge opening 33. Here, additional heat is added by heating coil 37 to cause the glass to flow more freely and to form into spheres which tend to follow the sloping surfaces of the opening 33 and the plug 34. These spheres follow the sloping surfaces toward their end and drop off into hopper 36 from which they are periodically removed. In order to facilitate the cooling of the glass spheres dropping from the surfaces of opening 33 and plug 34, copper cooling ribbons 38 may be provided in the sidewalls of the cooling zone 39.

These ribbons are in the form of thin, flexible copper bands or ribbons fixed at one end to the wall and extending outwardly into the path of the glass spheres. The spheres striking the copper ribbons give up their heat to the ribbons while being virtually unhindered in their free fall. Alternatively, the particles may fall into an atmosphere of powdered graphite or carbon where they give up their heat and are annealed.

In FIGURE 4, I have illustrated still another embodiment in which glass 50 is fed through a coil 51 in the form of a thread or rod. Coil 51 is raised to a temperature higher than glass 50 and sufficiently high to cause the glass to flow and form a ball on the end of the glass feed. This ball will periodically drop from the end of the glass feed in sized spheres depending upon the thickness of the feed stream 50. The glass sphere is preferably dropped through a cool zone into a cooling atmosphere of powdered carbon or graphite.

In still another embodiment of my invention, I admix ground, sized particles of glass with sufficient powdered graphite or carbon to separate the glass particles, and heat the mixture. The carbon transfers the heat to the particles of glass which individually fuse and spheroidize. The carbon or graphite prevents the individual glass particles from sticking together or agglomerating. The mixture is passed to a cooler zone and the graphite then separated from the resulting glass spheres.

This can be accomplished by passing the mixture through a rotating tube or barrel furnace as shown in FIGURE 5 or across a vibrating sheet of carbon or stainless steel, or by placing the mixture in retorts in a furnace, removing the retorts as soon as they have reached forming temperature (about 2300° F. for soft glass) and dumping the mixture when cooled to solidification temperature of the glass. In the drawings I have illustrated in FIGURE 5 a rotary barrel furnace of conventional type 60 having a moving bed of graphite 62 carrying particles of glass 61 moving downwardly through the furnace by rotation of the inclined furnace 60.

Parallel ribs 60 (chain line) may be provided on the surface on the embodiments shown in FIGURES 1 and 2 to act as cutting devices where it is desired to feed a continuous stream of glass to the surfaces. In such event the glass covering the high spot on the ridge close to the heat source will separate and part will flow to the lower level between the ridges thus permitting the continuous feeding of already liquid glass to the graphite surface.

The rate of formation in the embodiment illustrated in FIGURE 3 may be accelerated by applying suction to the discharge side of the opening 33. This may be accomplished in any of the well known ways.

It will be evident from the foregoing description that this invention may be otherwise embodied than as illustrated and described hereinabove. It will be accordingly understood that this invention may be practiced and embodied within the scope of the following claims.

I claim:

1. An apparatus for forming spheres of refractory materials comprising a source of material to be formed, a source of high temperature capable of causing softening of the refractory materials, a spaced source of lower temperature, heat transfer means which is not wetted by said material at the temperature of contact, said heat transfer means having at least one surface receiving discreet particles of the material to be formed at the source of high temperature and delivering said material from said source of high temperature which is the highest temperature in the system to said source of lower temperature and collecting means receiving the formed particles.

2. An apparatus for forming spheres of refractory materials comprising a source of particles of material to be formed, a source of high temperature capable of causing softening of the refractory materials, a spaced source of lower temperature, a heat transfer means selected from the group consisting of carbon and graphite, said heat transfer means having at least one surface receiving discreet particles of the particles to be formed at the source of high temperature and delivering said material from said source of high temperature which is the highest temperature in the system to said source of lower temperature and collecting means receiving the formed particles.

3. An apparatus as claimed in claim 2 wherein the heat transfer means is in the form of a sloping plate heated by electrical resistance.

4. An apparatus as claimed in claim 2 wherein the heat transfer means is a rotating cylinder.

5. An apparatus as claimed in claim 2 wherein the heat transfer means is a moving bed of powdered material selected from the group consisting of graphite and carbon.

6. An apparatus for forming spheres of refractory materials comprising a source of material to be formed, a crucible having at least one surface receiving discreet particles of said material, a frusto conical outlet at the bottom of said crucible having its largest diameter most distant from the crucible, an inverted conical stopper in said outlet vertically movable therein to control the opening size, heater means surrounding the crucible to deliver heat therethrough to the material to be formed, auxiliary heater means surrounding the outlet to impart a higher temperature thereto than in the crucible and a cooling zone beneath said opening receiving the formed material leaving the outlet.

7. A method for forming spheres of refractory materials comprising the steps of heating particles of said material in a heating zone in contact with a surface which is not wetted by said material at the temperature of contact to the fusion temperature of said material, moving the fused particles from the heating zone to a cooling zone all the while maintaining the particle in contact with said non-wetting surface, cooling the particle leaving the non-wetting surface and collecting said cooled particles.

References Cited in the file of this patent

UNITED STATES PATENTS

| | | |
|---|---|---|
| 857,756 | Reddy | June 25, 1907 |
| 1,932,499 | Woods | Oct. 13, 1933 |
| 2,269,528 | Gallup | Jan. 13, 1942 |
| 2,461,011 | Taylor et al. | Feb. 8, 1949 |
| 2,488,353 | Unger | Nov. 15, 1949 |
| 2,511,088 | Whaley | June 13, 1950 |
| 2,567,121 | Olsen | Sept. 4, 1951 |
| 2,601,642 | Stammer et al. | June 24, 1952 |
| 2,712,621 | North | July 5, 1955 |